Figure 5:
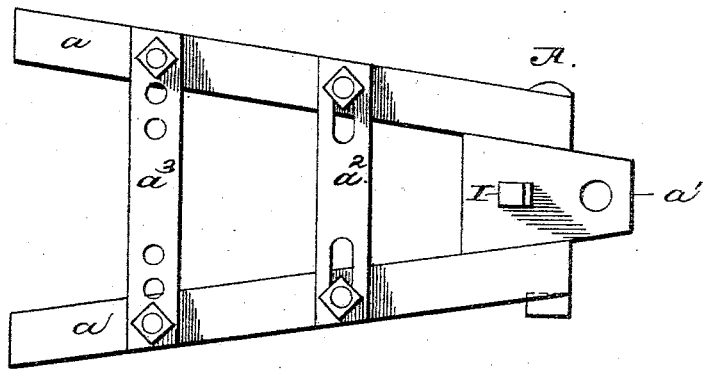

(No Model.) 2 Sheets—Sheet 1.
S. O. RICHARDSON.
COMBINED SEED PLANTER AND FERTILIZER DISTRIBUTER.
No. 321,453. Patented July 7, 1885.
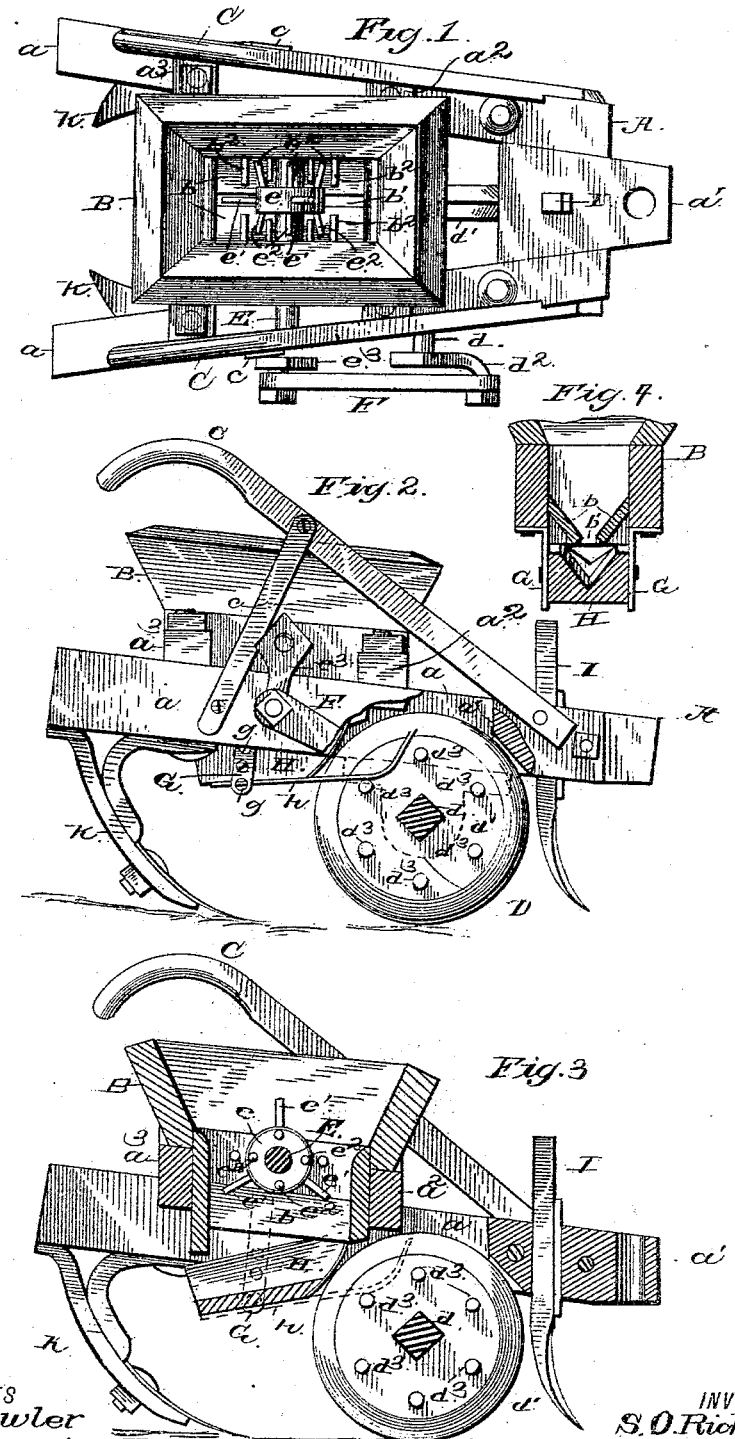

(No Model.) 2 Sheets—Sheet 2.

S. O. RICHARDSON.
COMBINED SEED PLANTER AND FERTILIZER DISTRIBUTER.

No. 321,453. Patented July 7, 1885.

WITNESSES
M. E. Fowler
E. G. Siggers

INVENTOR
S. O. Richardson
By his Attorneys
C. A. Snow & Co.

UNITED STATES PATENT OFFICE.

SAMUEL OLEVER RICHARDSON, OF CANTRELL, SOUTH CAROLINA.

COMBINED SEED-PLANTER AND FERTILIZER-DISTRIBUTER.

SPECIFICATION forming part of Letters Patent No. 321,453, dated July 7, 1885.

Application filed February 14, 1885. (No model.)

*To all whom it may concern:*

Be it known that I, SAMUEL O. RICHARDSON, a citizen of the United States, residing at Cantrell, in the county of Spartanburg and State of South Carolina, have invented a new and useful Improvement in a Combined Seed-Planter and Fertilizer-Distributer, of which the following is a specification, reference being had to the accompanying drawings.

My invention relates to an improvement in fertilizer-distributers; and it consists in the peculiar construction and combination of devices that will be more fully set forth hereinafter.

In the accompanying drawings, Figure 1 is a top plan view of a machine embodying my invention. Fig. 2 is a side elevation of the same, partly in section. Fig. 3 is a vertical longitudinal central section. Fig. 4 is a detailed transverse section. Fig. 5 is a top plan view of the frame, the hopper being removed.

A represents a V-shaped frame consisting of the side beams, $a$, which are secured together at their front ends by bolts that pass through the beams and through the block $a'$ that is placed between them. Cross-beams $a^2$ $a^3$ are bolted on the upper sides of the beams $a$, and to these cross-beams is secured a hopper, B. In the lower side of this hopper are placed the two inclined boards $b$, which form the bottom thereof, and between the lower edges of these boards is left an opening, $b'$, as shown.

Handles C are secured to the front end of the frame, and are supported near their rear ends by the bars $c$.

Bearing-blocks D are bolted to the under sides of the beams $a$ near the front end of the frame, and in these blocks is journaled a shaft, $d$, to the center of which is fixed a driving-wheel, $d'$. A crank, $d^2$, is fixed to one end of the shaft $d$.

E represents a transverse shaft that has its bearings in the hopper. To the center of this shaft is secured a disk, $e$, which is provided with radial arms or stirrers $e'$, which project from the periphery of the disk, and with horizontal stirrers $e^2$ that project from the sides of the disk and extend nearly to the vertical walls of the throat of the hopper. Similar arms, $b^2$, project inwardly from the sides of the throat of the hopper. To the projecting end of the shaft E is fixed a crank, $e^3$. A connecting-rod, F, is secured to the cranks $d^2$ and $e^3$. When the wheel $d'$ is rotated by the forward movement of the machine, the shaft E is rocked.

Hangers G depend centrally from the lower sides of the hopper, and in between these hangers is pivoted a shaker, H. A bar, $h$, is secured to the under side of this shaker and extends forwardly therefrom, and has its front end curved upwardly, as shown. Tappet-pins $d^3$ project from one side of the driving-wheel and operate the shaker as the wheel revolves.

To the block $a'$ is secured the furrow-opener I in advance of the driving-wheel, and to the under sides of the beams $a$, near their rear ends, are bolted the ridging-plows K.

The hangers G are provided with a series of openings, $g$, by means of which the shaker is adapted to be pivoted at any desired distance below the hopper.

The cross-beam $a^2$ is slotted where the bolts which secure it to the beams $a$ pass through, and the cross-beam $a^3$ is provided with series of bolt-holes on its ends beyond the hopper; and by this construction of the frame it will be readily understood that the rear ends of the beams $a$ may be brought nearer together or widened apart, so as to adjust the plows that are attached to said beams laterally, and cause them to throw up ridges of the desired width.

A fertilizer-distributer thus constructed is adapted for distributing either commercial fertilizer or barn-yard manure, or for planting cotton-seeds.

When the machine is to be used for distributing commercial fertilizers, the furrow-opener is removed and the shaker adjusted so as to deliver the desired quantity of fertilizer from the hopper. When in use for distributing barn-yard manure, the shaker is also removed. When in use for planting cotton-seed, the furrow-opener is employed as well as the ridging-plows, the shaker is removed, and the beams are adjusted laterally to the required width.

A machine thus constructed is exceedingly simple, is positive and efficient in operation, and will be found a very valuable auxiliary on any well-conducted farm.

Having thus described my invention, I claim—

1. The combination of the frame, the hopper, and inclined boards $b$, located within the latter on each side so as to form the bottom, a space or opening, $b'$, being left between the boards, with lateral arms or pins $b^2$ projecting inwardly from the inner sides of the hopper above the boards, the stirrer-shaft carrying the disk $e$, radial arms or stirrers $e'$ projecting from the periphery of the disk, lateral or horizontal stirrers $e^2$, extending from the sides of the disk and registering with the spaces between the arms $b^2$ of the hopper, and the shaker or dropper H, communicating with the bottom of the hopper, for the purpose set forth.

2. The herein-described adjustable frame, comprising the block $a'$, the side beams, $a$, secured together at their front ends on each side of the blocks, and the cross-beams, $a^2\ a^3$, connecting the side beams and adjustable in length, whereby the side beams may be drawn nearer to each other, as set forth.

3. The frame and carrying-wheel provided with the radial pins, in combination with the hopper, the inclined boards $b$, located on each side thereof so as to form the bottom, an opening or space, $b'$, being left between the boards, lateral pins or arms $b^2$ projecting inwardly from the hopper above the boards, the stirrer-shaft E, a rod, F, connecting the latter with the shaft of the carrying-wheel, a disk, $e$, located on the shaft E above the opening $b'$, a series of radial arms or pins, $e'$, projecting from the periphery of the disk and working in the opening, a series of lateral or horizontal pins, $e^2$, projecting outwardly from the sides of the disk and working in the spaces between the arms or pins $b^2$ of the hopper, hangers G, depending from the latter, the inclined shaker or dropper H, adjustably pivoted to the hangers and having its rear end open, and the bar $h$, fitted to the shaker and extending forward so as to be acted upon by the pins of the carrying-wheel, as set forth.

In testimony that I claim the foregoing as my own I have hereto affixed my signature in presence of two witnesses.

SAMUEL OLEVER RICHARDSON.

Witnesses:
   T. R. TRIMMIER,
   H. F. EVANS.